United States Patent
Sundaram et al.

(10) Patent No.: US 8,538,930 B2
(45) Date of Patent: Sep. 17, 2013

(54) METHOD AND SYSTEM FOR DATABASE RECOVERY

(75) Inventors: Girish Sundaram, Pune (IN); Ramya Hh Prasad, Pune (IN)

(73) Assignee: International Business Machines Corporation, Armonk, NY (US)

( * ) Notice: Subject to any disclaimer, the term of this patent is extended or adjusted under 35 U.S.C. 154(b) by 396 days.

(21) Appl. No.: 12/576,422

(22) Filed: Oct. 9, 2009

(65) Prior Publication Data

US 2011/0087637 A1    Apr. 14, 2011

(51) Int. Cl.
*G06F 17/30* (2006.01)
*G06F 7/00* (2006.01)
*G06F 17/00* (2006.01)

(52) U.S. Cl.
USPC ......... 707/675; 707/758; 705/7.11; 705/7.27; 705/348

(58) Field of Classification Search
USPC ............... 707/675, 758; 705/7.11, 7.27, 348
See application file for complete search history.

(56) References Cited

U.S. PATENT DOCUMENTS

| | | | |
|---|---|---|---|
| 5,043,871 A | 8/1991 | Nishigaki et al. | |
| 5,446,884 A | 8/1995 | Schwendemann et al. | |
| 5,778,387 A | 7/1998 | Wilkerson et al. | |
| 5,913,219 A | 6/1999 | Baek et al. | |
| 6,202,071 B1 | 3/2001 | Keene | |
| 2003/0093575 A1* | 5/2003 | Upton | 709/310 |
| 2003/0126181 A1 | 7/2003 | Young | |
| 2004/0073657 A1* | 4/2004 | Palmer et al. | 709/224 |
| 2005/0086664 A1 | 4/2005 | Sundaresan | |
| 2005/0172288 A1 | 8/2005 | Ahuja et al. | |
| 2006/0184410 A1 | 8/2006 | Ramamurthy et al. | |
| 2007/0005539 A1* | 1/2007 | Bergman et al. | 706/21 |
| 2007/0043784 A1 | 2/2007 | Parkinson | |
| 2007/0266051 A1* | 11/2007 | Moore | 707/200 |
| 2008/0071593 A1* | 3/2008 | Tanaka et al. | 705/7 |
| 2008/0082863 A1* | 4/2008 | Coldicott et al. | 714/25 |
| 2010/0049748 A1* | 2/2010 | Vanga et al. | 707/200 |
| 2010/0174583 A1* | 7/2010 | Passova et al. | 705/10 |

OTHER PUBLICATIONS

Restore Database Command, available at http://publib.boulder.ibm.com/infocenter/db2luw/v8/index.jsp?topic=/com.ibm.db2.udb.doc/core/r0001976.htm, 2009, (10 pgs.).

Oracle Backup and Recovery, available at http://www.oracle.com/technology/deploy/availability/htdocs/BR_Overview.htm, 2009, (11 pgs.).

* cited by examiner

*Primary Examiner* — Alicia Lewis (74) *Attorney, Agent, or Firm* — Anthony V. S. England; Terry J. Carroll (57) ABSTRACT

A business process catalog is built using pattern analysis of historical data of a database and deploying the built business process catalog to perform database recovery. A first set of statements are logged for transactions of a first business process batch and compared with a second set of statements. The second set of statements is included in a second business batch process stored in the business process catalog. The business process catalog is updated based on the comparison of the first and second sets of statements. The built business process catalog is deployed to identify and present business process batches to a database system user to select a business process batch used to perform the database system recovery.

19 Claims, 7 Drawing Sheets

METHOD AND SYSTEM FOR DATABASE RECOVERY

BACKGROUND OF THE INVENTION

Database recovery is an activity of replacing an existing database or creating a new database using a previous version or copy of the backup taken at an older point of time and using transaction logs and any existing archive logs to apply the transactions to roll forward the database to a valid and consistent state.

Current recovery methods in conventional data servers exist, such as, for example:
- Time-based recovery technique, also called point-in-time recovery (PITR), which recovers the data up to a specified point in time.
- Transaction log based recovery technique where database is rolled forward till the transactions from a specific transaction log file (archive or un-archived) is applied.
- Change-based recovery technique or log sequence recovery technique based on the system change number assigned by the data server.

For these different techniques, a database user or a database administrator requires certain inputs. The time-based recovery technique requires timestamp information, transaction log based recovery technique requires information on log file location and name information and the change-based recovery technique requires System Change number (SCN) or Log Sequence Number (LSN).

When one uses one of these techniques, it is observed that recovery of a database without data loss is difficult unless at least one of the above noted inputs is known. Taking into account that many data servers today are becoming increasingly autonomic and business process oriented, it is desirable to develop a new technique where it is possible to do a database recovery based on the occurrence of a business process.

BRIEF SUMMARY OF THE INVENTION

Aspects of the invention are directed to a method, a system for recovering a database using business processes. According to a first aspect of the invention, a method for recovery of a database system using business processes is disclosed.

A second aspect of the invention discloses a method for building a business process catalog. The business catalog includes a set of business process batches created using a pattern analysis of historical data of a database system. The method of building business process catalog includes the steps of logging a first set of statements corresponding to a plurality of transactions of a first business process batch, assigning a name generated by the database system to the first business process batch, wherein the assigning is done when all the transactions of the first business process batch are complete.

According to a third aspect of the invention is disclosed a method for comparing the first set of statements with a second set of statements, wherein the second set of statements is included in a second business process batch and the second business process batch is stored in the business process catalog.

According to a fourth aspect of the invention is disclosed a method for storing the first business process batch in the business process catalog and storing corresponding recovery information of the first business process batch, if a match is not found between the first set of statements and the second set of statements.

Another aspect of the invention discloses a method for updating the business process catalog with corresponding metadata of the second business process batch, and storing corresponding updated recovery information of the second business process batch in the business process catalog, if a match is found between the first set of statements and the second set of statements.

A yet another aspect of the invention discloses a method for prompting a database system user, if a match is found between the first set of statements and the second set of statements, to assign a user assigned name to the second business process batch if a frequency of occurrence of the second business process batch is greater than or equal to a pre-defined threshold during a pre-defined time interval.

A further aspect of the invention discloses a method for performing the database recovery using the business process catalog described in the previous aspects.

In another aspect of the invention, a method for identifying a set of business process batches in response to a request for recovery of the database system using the business process catalog and then presenting the set of business process batches, is disclosed. The method further includes the step of selecting a business process batch from the set of business process batches and performing the database recovery using the selected business process batch.

A further aspect of the invention discloses, a system of recovery of a database system using business processes. A system for performing database system recovery includes a processor configured to build a business process catalog, wherein the business process catalog includes a set of business process batches created using a pattern analysis of historical data of a database system. The system further includes the processor configured to perform database system recovery using the business process catalog.

BRIEF DESCRIPTION OF THE DRAWINGS

Embodiments of the present invention are described in detail below, by way of example only, with reference to the following schematic drawings, where.

DETAILED DESCRIPTION OF THE INVENTION

Aspects of the invention describe, in an exemplary embodiment, database system recovery based on the use of a business process. A business process is a set of coordinated tasks and activities, conducted by people and equipment/software, which leads to accomplishing a specific organizational goal. In terms of a database server, a business process can be defined as a set of individual business process batches each of which can be further decomposed into a set of individual transactions having one or more SQL statements.

The method of database system recovery based on the use of the business process, can be divided in an exemplary mode, into two phases: viz. a business process catalog building phase, and a database recovery phase. Both these phases are described in detail later in some embodiments of the invention.

Figure 1:
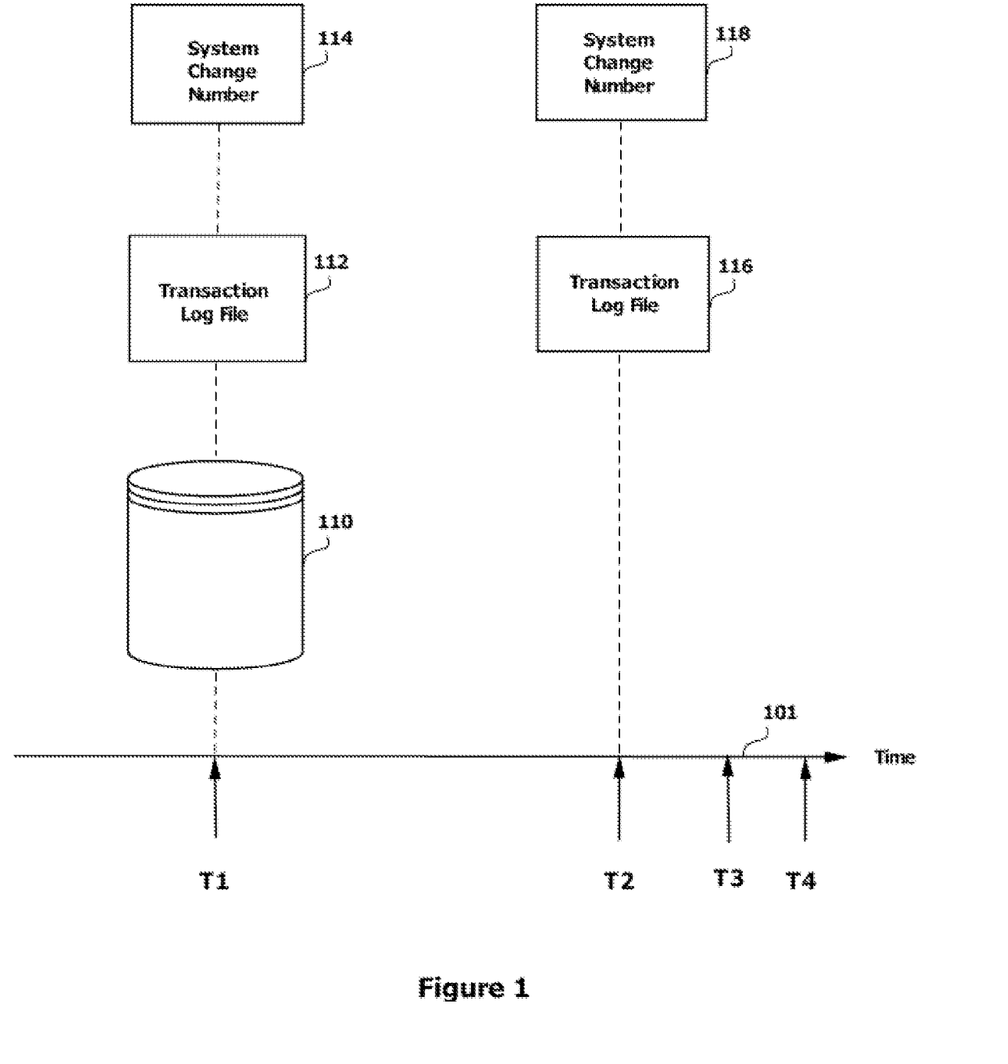
FIG. 1 shows a schematic of database system recovery techniques found in prior art.

FIG. 1 illustrates a prior art schematic 100 of database system recovery techniques. The schematic 100 shows time axis 101 and various elements such as a database backup 110, two exemplary transaction log files 112 and 116 and also the database system change number elements 114 and 118.

On the time axis 101 are shown time stamps T1, T2, T3 and T4-T4 being the current time. Corresponding to time T1 are the database backup 110, transaction log file 112 and database system change number element 114. Corresponding to time T2 are the transaction log file 116 and database system change number element 118.

In the transaction log based recovery technique reported in prior art, database recovery is initiated by specifying a transaction log file. The database server then performs a consistent recovery by applying the transactions and rolling back uncommitted transactions in transaction log files such as 112 or 116 till the last specified transaction log file.

In time based recovery technique, a target timestamp is specified and recovery functions of the database such as rolling back and forward are performed until the timestamp is reached. An example of a command that performs recovery of this type is as follows:
"RECOVER DATABASE UNTIL TIME 'YYYY-MM-DD: HH24:MI:SS';"

In change based recovery technique, every modification in the database system is given a unique SCN, which is, therefore an ever increasing integer. When performing a change based recovery technique, a specific SCN is given by the database administrator and then the database is returned to its transaction-consistent state at the specified SCN. For example, if the recovery is to be performed at the database system change element 118 representing an SCN of 13456, it could be performed using a command such as
"RECOVER DATABASE UNTIL CHANGE 13456;"
By restoring the datafiles from the backup taken at SCN 13456 and then applying the captured transactions such as in 116, the recovery can be performed.

Figure 2:
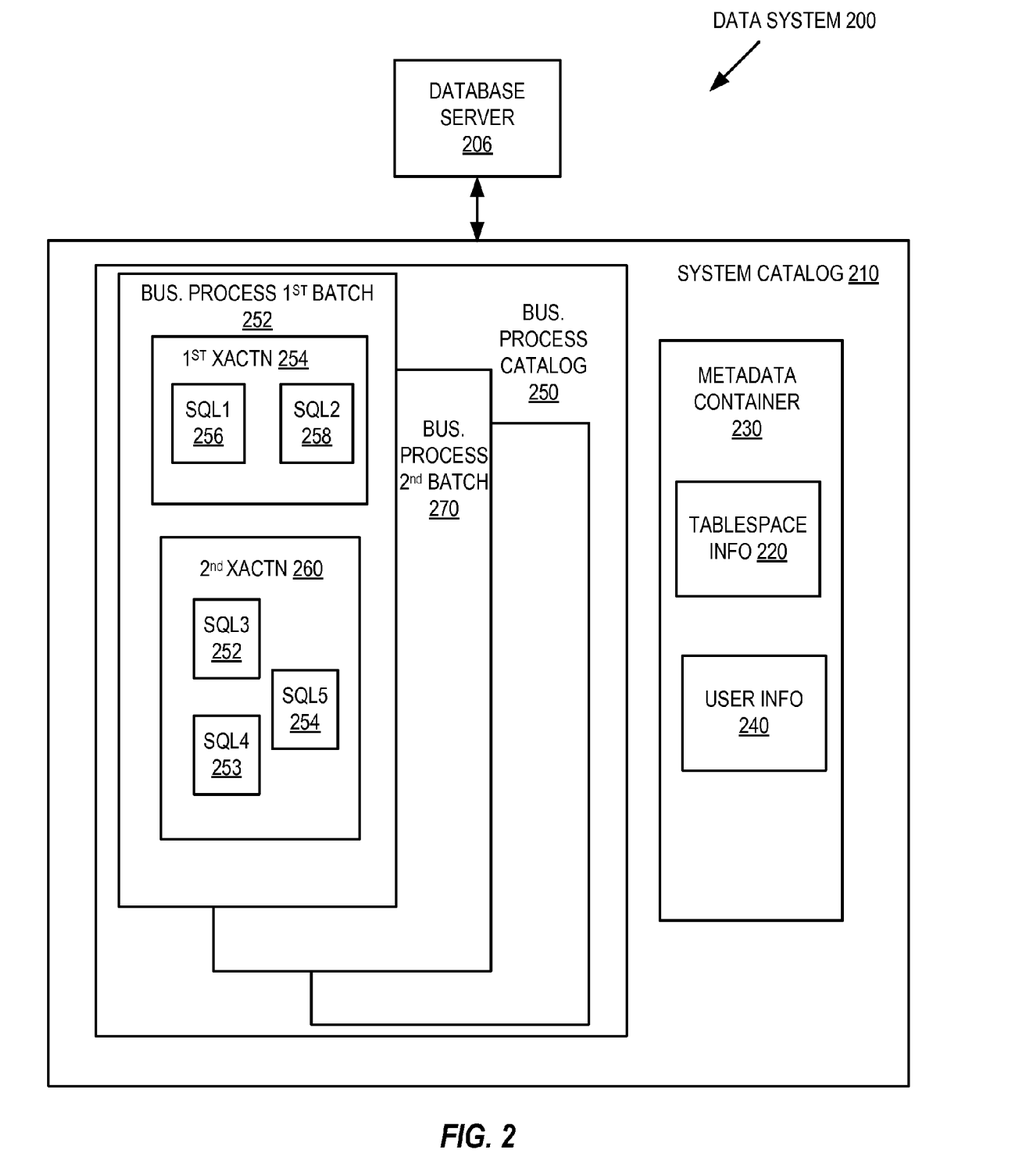
FIG. 2 schematically illustrates the business process catalog and further details of the business process catalog.

FIG. 2 shows a database system 200 having a database server 206 and a system catalog 210, wherein the database server 206 and the system catalog 210 are functionally coupled. System catalog 210 stores metadata about the database system 200 and some examples of its contents are given below. Element 230 represents metadata container and has elements such as a tablespace information element 220 and a user information element 240. The business process catalog 250 is one of the aspects of the current invention, and it is also part of the system catalog 210. The business process catalog 250 in turn may have elements such as business process batch1 252 and business process batch2 270 as shown. Each business process batch may in turn have multiple business process transactions. As an example, business process batch1 252 has business process transaction1 254 and business process transaction2 260. Each business process transaction may further have multiple SQL statements. As an example, business process transaction1 254 includes SQL1 256 and SQL2 258. As another example, business process transaction2 260 includes SQL3 262, SQL4 263 and SQL5 264.

Figure 3:
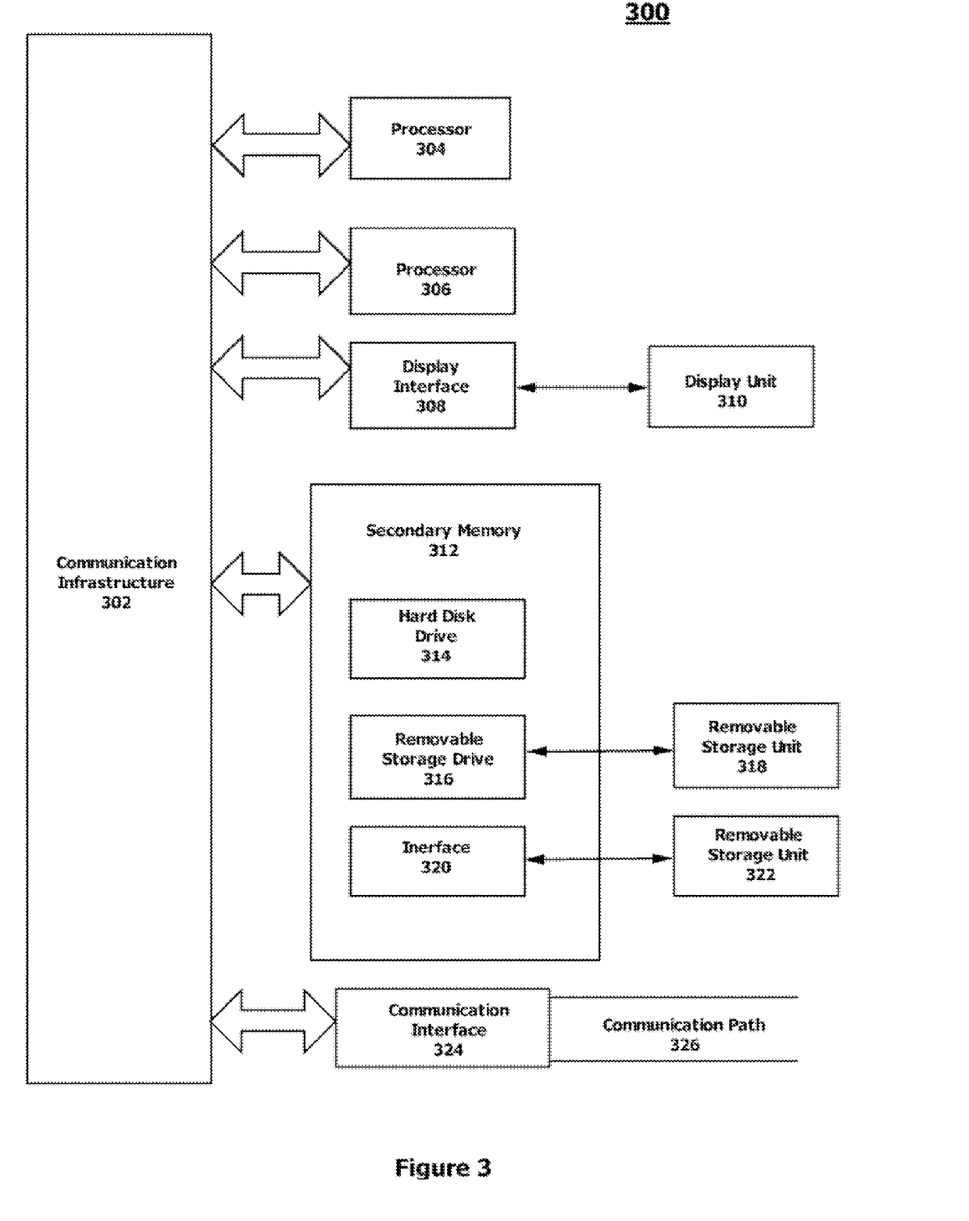
FIG. 3 shows a detailed schematic of a data processing system used for database system recovery that uses a business process catalog in accordance with an embodiment of the invention.

FIG. 3 is a block diagram of an exemplary computer system 300 that can be used for implementing various embodiments of the present invention. In some embodiments, the computer system 300 can be used as the database backup 110 as shown in FIG. 1 or the database server 206 or the database system 200 as shown in FIG. 2. The computer system 300 includes a processor 304. It should be understood that although FIG. 3 illustrates a single processor, one skilled in the art would appreciate that more than one processor can be included as needed. The processor 304 is connected to a communication infrastructure 302 (for example, a communications bus, cross-over bar, or network). Various software embodiments are described in terms of this exemplary computer system. After reading this description, it will become apparent to a person of ordinary skill in the relevant art(s) how to implement the invention using other computer systems and/or computer architectures.

The computer system 300 can include a display interface 308 configured to forward graphics, text, and other data from the communication infrastructure 302 (or from a frame buffer not shown) for display on a display unit 310. The computer system 300 also includes a main memory 306, which can be random access memory (RAM), and may also include a secondary memory 312. The secondary memory 312 may include, for example, a hard disk drive 314 and/or a removable storage drive 316, representing, for example, a floppy disk drive, a magnetic tape drive, an optical disk drive, etc. The removable storage drive 316 reads from and/or writes to a removable storage unit 318 in a manner well known to those having ordinary skill in the art. The removable storage unit 318, represents, for example, a floppy disk, magnetic tape, optical disk, etc. which is read by and written to by the removable storage drive 316. As will be appreciated, the removable storage unit 318 includes a computer usable storage medium having stored therein computer software and/or data.

In exemplary embodiments, the secondary memory 312 may include other similar means for allowing computer programs or other instructions to be loaded into the computer system. Such means may include, for example, a removable storage unit 322 and an interface 320. Examples of such may include a program cartridge and cartridge interface (such as that found in video game devices), a removable memory chip (such as an EPROM, or PROM) and associated socket, and other removable storage units 322 and interfaces 320 which allow software and data to be transferred from the removable storage unit 322 to the computer system 300.

The computer system 300 may also include a communications interface 324. The communications interface 324 allows software and data to be transferred between the computer system and external devices. Examples of the communications interface 324 may include a modem, a network interface (such as an Ethernet card), a communications port, a PCM-CIA slot and card, etc. Software and data transferred via the communications interface 324 are in the form of signals which may be, for example, electronic, electromagnetic, optical, or other signals capable of being received by communications interface 324. These signals are provided to the communications interface 324 via a communications path (that is, channel) 326. The channel 326 carries signals and may be implemented using wire or cable, fiber optics, a phone line, a cellular phone link, an RF link, and/or other communications channels.

In this document, the terms "computer program medium," "computer usable medium," and "computer readable medium" are used to generally refer to media such as the main memory 306 and the secondary memory 312, the removable storage drive 316, a hard disk installed in the hard disk drive 314, and signals. These computer program products are means for providing software to the computer system. The computer readable medium allows the computer system to read data, instructions, messages or message packets, and other computer readable information from the computer readable medium. The computer readable medium, for example, may include non-volatile memory, such as Floppy, ROM, Flash memory, Disk drive memory, CD-ROM, and other permanent storage. It can be used, for example, to transport information, such as data and computer instructions, between computer systems. Furthermore, the computer readable medium may comprise computer readable information in a transitory state medium such as a network link and/or a network interface, including a wired network or a wireless network, that allows a computer to read such computer readable information.

Computer programs (also referred to herein as computer control logic) are stored in the main memory 306 and/or the secondary memory 312. Computer programs may also be received via the communications interface 324. Such computer programs, when executed, can enable the computer system to perform the features of exemplary embodiments of the present invention as discussed herein. In particular, the computer programs, when executed, enable the processor 304 to perform the features of the computer system 300. Accordingly, such computer programs represent controllers of the computer system.

Figure 4:
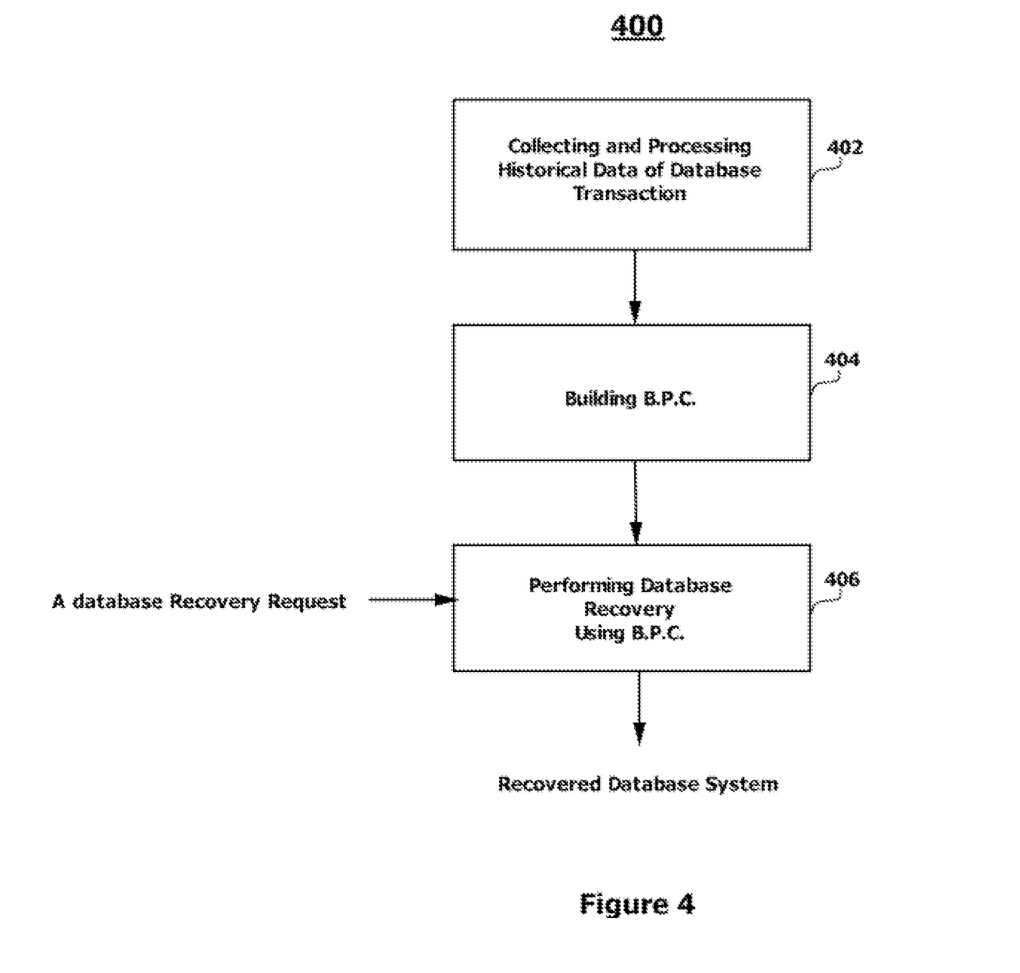
FIG. 4 shows a flow chart for database system recovery that uses the business process catalog according to an embodiment of the invention.

FIG. 4 shows a flow chart illustrating an exemplary embodiment of a general method 400 for database system recovery based on the use of a business process catalog. Step 402 depicts collection and processing of historical data of database transactions. Step 404 depicts building of the business process catalog 250 (FIG. 2) using the historical data. The historical data is analyzed and pattern analysis is performed on the historical data to build the business process catalog 250. When the business process catalog 250 is built, it is also continuously updated as database transactions get added. In case of database system crash or database replication or any other similar situation where recovery of a database system is desired, a recovery request is sent. Step 406 depicts performing database system recovery in response to receiving the recovery request using the business process catalog 250 built in step 404.

Figure 5:
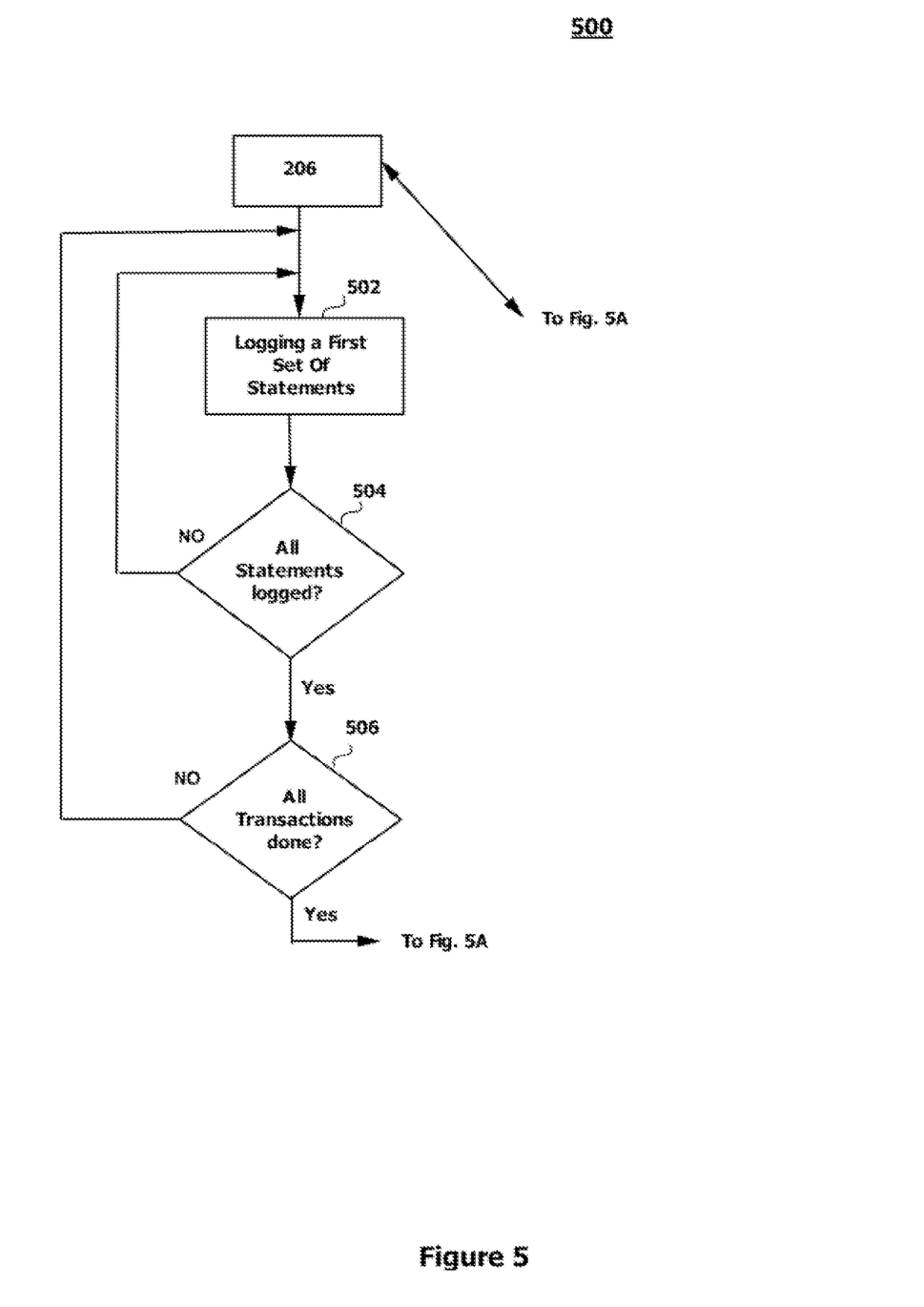
FIG. 5 and FIG. 5A together show a flow chart for building a business process catalog according to an embodiment of the invention.
Figure 5A:
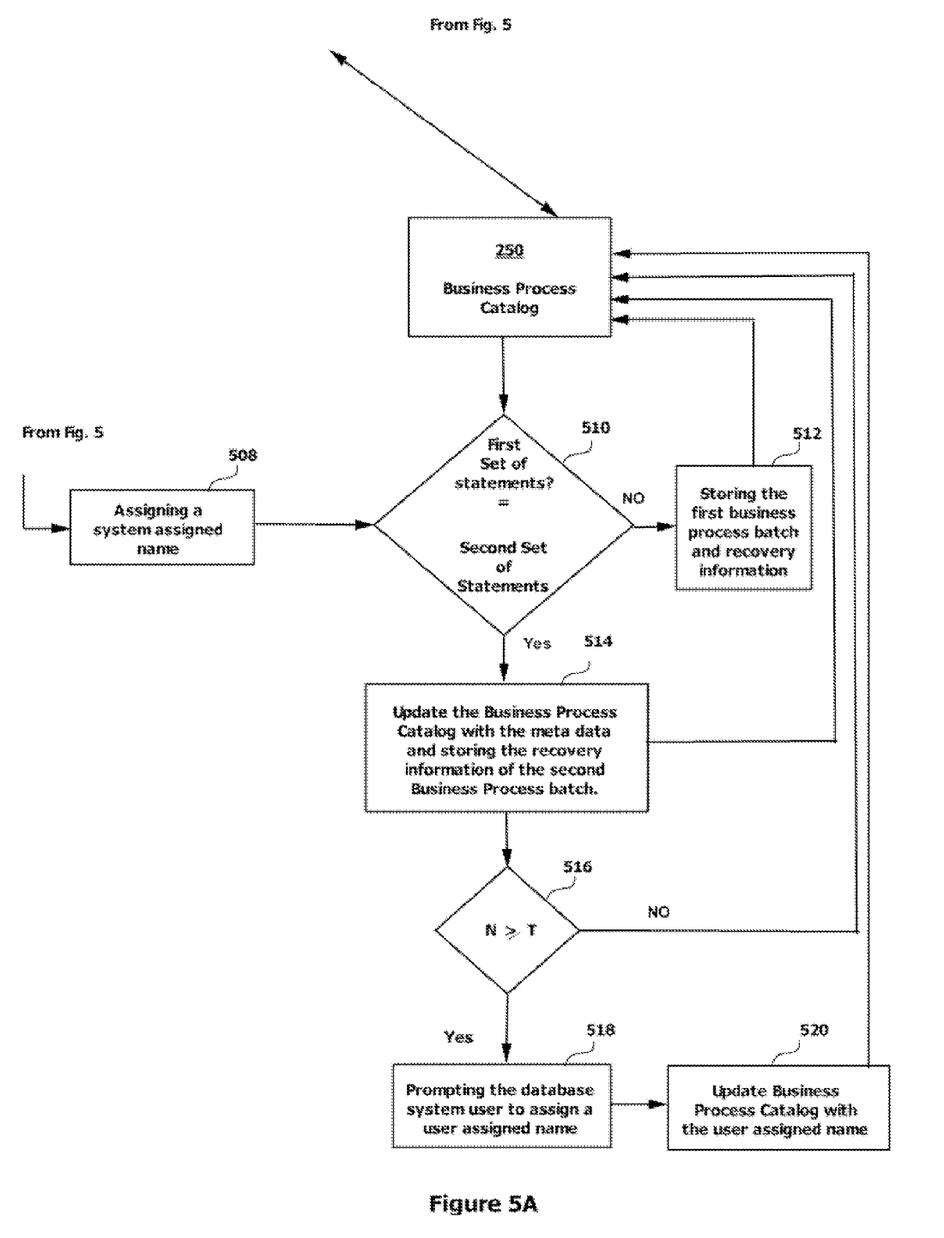

FIG. 5 and FIG. 5A together show a flow chart illustrating a general method 500 for building a business process catalog according to an embodiment of the invention. The method 500 uses the database server 206 (FIG. 2), where database transactions are recorded. Step 502 depicts logging a first set of statements corresponding to a plurality of transactions of a first business process batch. Step 504 checks if all the statements corresponding to a database transaction are logged. The next step 506 depicts the execution of logic that checks if all the database transactions of the business process batch are complete. Step 508 depicts assigning a system assigned name generated by the database server to the first business process batch. Step 510 depicts comparison of the first set of statements with the second set of statements wherein the second set of statements is included in a second business process batch and the second process batch is stored in the business process catalog 250 (FIG. 2). If no match is found between the first set of statements and the second set of statements, the first business process batch having the first set of statements is recorded as a new (previously not recorded) batch and the first business process batch along with its associated recovery information is stored in the business process catalog 250 with the system assigned name obtained in step 508. Step 512 depicts the process of storing the first business process batch and the corresponding recovery information in the business process catalog 250.

The recovery information corresponding to the first business process batch includes, such as, for example, number of users executing the first business process batch, transaction logs storing the data used in the first business process batch, commit time of the first business process batch, data files storing the data of the first business process batch, and SQL statement details of the first business process batch. If a match found between the first set of statements and the second set of statements, step 514 depicts updating the business process catalog 250 with metadata of the second business process batch, and storing corresponding updated recovery information of the second business process. The recovery information and the metadata corresponding to the second business process batch include, such as, for example, number of users executing the second business process batch, transaction logs storing the data used in the second business process batch, commit time of the second business process batch, data files storing the data of the second business process batch, and SQL statement details of the second business process batch.

Step 516 depicts checking a frequency of occurrence of the second business process batch. In step 516, if N (number of times the second business process batch was executed till current database transaction and including current database transaction) is compared with T (pre-defined threshold). If the value of N is greater than or equal to T, it indicates that the second business process batch is a frequently executed business process batch. Step 518 depicts prompting the database system user to assign a user assigned name to the second business process batch. Step 520 depicts the process of updating the business process catalog 250, with the user assigned name of the second business batch process identified in step 518.

Figure 6:
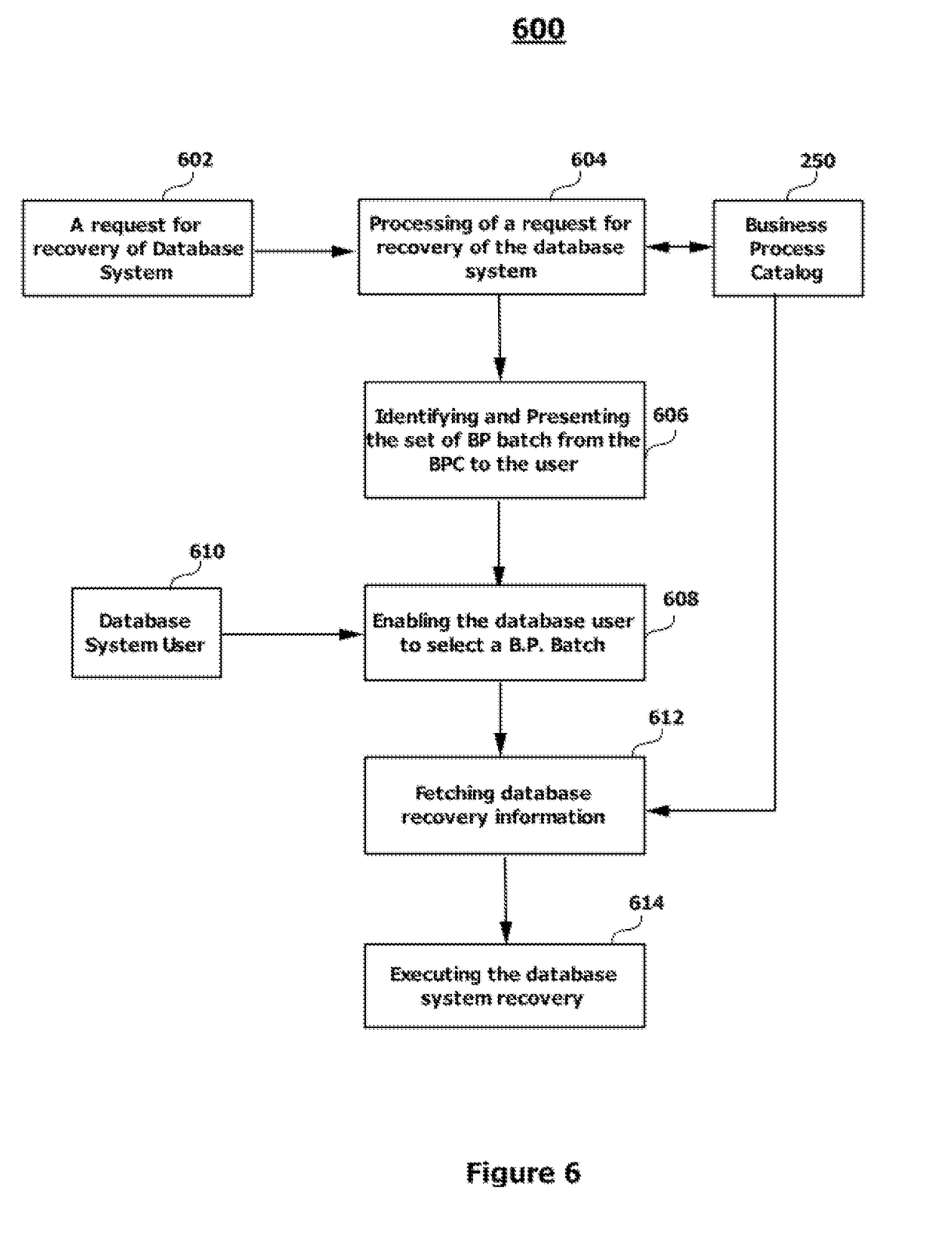
FIG. 6 shows a flow chart for deployment of a business process catalog for performing database system recovery, where the business process catalog is built as shown in FIG. 5 and FIG. 5A.

FIG. 6 shows a flow chart illustrating the method 600 for deployment of a business process catalog 250 (FIG. 2), for performing a database system recovery, where the business process catalog 250 is built according to the general method 500 of FIG. 5.

Element 602 depicts a request for recovery of the database system. Step 604 depicts the processing of the request for recovery of the database system received from element 602. This processing uses the business process catalog 250 (FIG. 2). Step 606 depicts the step of identifying a set of business process batches in response to a request for recovery of the database system using the business process catalog 250. Step 606 also depicts the step of presenting the set of identified business process batches to the database system user 610. Step 608 shows enabling the database system user 610 to select a business process batch from the presented set of identified business process batches. Step 612 depicts that once the specific business process batch is selected by the database system user 610 in step 608, recovery information corresponding to the selected business process batch is fetched from the business process catalog 250. Having obtained the recovery information of the selected business process batch from the business process catalog 250, step 614 depicts executing the database system recovery using the selected business process batch. The step 614 involves using various log-files and other metadata information corresponding to the selected business process batch. The database system recovery is executed using the consistent point in time when the selected batch process was executed.

An exemplary database system can be a relational database system. Various embodiments described for a general database system recovery would be similarly applicable to the relational database system recovery.

Advantages of various aspects of the invention include reduced or no dependency on non-intuitive data like a timestamp, a log file name/location or a System Change Number (SCN) for performing database system recovery, and built-in intelligence in the database system to identify transaction behavior. The database system stores the historical pattern analysis of various business processes and also stores recovery information specific to these business processes to be used later for the database system recovery. Another advantage of various aspects of the invention is that the down time needed for restoring the database is reduced since the trial and error approach followed by conventional database systems in the absence of accurate recovery information is eliminated.

The described techniques may be implemented as a method, apparatus or article of manufacture involving software, firmware, micro-code, hardware such as logic, memory and/or any combination thereof. The term "article of manufacture" as used herein refers to code or logic and memory implemented in a medium, where such medium may include hardware logic and memory [e.g., an integrated circuit chip, Programmable Gate Array (PGA), Application Specific Integrated Circuit (ASIC), etc.] or a computer readable medium, such as magnetic storage medium (e.g., hard disk drives, floppy disks, tape, etc.), optical storage (CD-ROMs, optical disks, etc.), volatile and non-volatile memory devices [e.g., Electrically Erasable Programmable Read Only Memory (EEPROM), Read Only Memory (ROM), Programmable Read Only Memory (PROM), Random Access Memory (RAM), Dynamic Random Access Memory (DRAM), Static Random Access Memory (SRAM), flash, firmware, programmable logic, etc.]. Code in the computer readable medium is accessed and executed by a processor.

The medium in which the code or logic is encoded may also include transmission signals propagating through space or a transmission media, such as an optical fiber, copper wire, etc. The transmission signal in which the code or logic is encoded may further include a wireless signal, satellite transmission, radio waves, infrared signals, Bluetooth, the internet etc. The transmission signal in which the code or logic is encoded is capable of being transmitted by a transmitting station and received by a receiving station, where the code or logic encoded in the transmission signal may be decoded and stored in hardware or a computer readable medium at the receiving and transmitting stations or devices. Additionally, the "article of manufacture" may include a combination of hardware and software components in which the code is embodied, processed, and executed. Of course, those skilled in the art will recognize that many modifications may be made without departing from the scope of embodiments, and that the article of manufacture may include any information bearing medium. For example, the article of manufacture includes a storage medium having stored therein instructions that when executed by a machine results in operations being performed.

Certain embodiments can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, certain embodiments can take the form of a computer program product accessible from a computer usable or computer readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

The terms "certain embodiments", "an embodiment", "embodiment", "embodiments", "the embodiment", "the embodiments", "one or more embodiments", "some embodiments", and "one embodiment" mean one or more (but not all) embodiments unless expressly specified otherwise. The terms "including", "comprising", "having" and variations thereof mean "including but not limited to", unless expressly specified otherwise. The enumerated listing of items does not imply that any or all of the items are mutually exclusive, unless expressly specified otherwise. The terms "a", "an" and "the" mean "one or more", unless expressly specified otherwise.

Elements that are in communication with each other need not be in continuous communication with each other, unless expressly specified otherwise. In addition, elements that are in communication with each other may communicate directly or indirectly through one or more intermediaries. Additionally, a description of an embodiment with several components in communication with each other does not imply that all such components may be used. On the contrary a variety of optional components are described to illustrate the wide variety of possible embodiments.

Further, although process steps, method steps or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously, in parallel, or concurrently. Further, some or all steps may be performed in run-time mode.

When a single element or article is described herein, it will be apparent that more than one element/article (whether or not they cooperate) may be used in place of a single element/article. Similarly, where more than one element or article is described herein (whether or not they cooperate), it will be apparent that a single element/article may be used in place of the more than one element or article. The functionality and/or the features of an element may be alternatively embodied by one or more other elements which are not explicitly described as having such functionality/features. Thus, other embodiments need not include the element itself.

Computer program means or computer program in the present context mean any expression, in any language, code or notation, of a set of instructions intended to cause a system having an information processing capability to perform a particular function either directly or after either or both of the following a) conversion to another language, code or notation; b) reproduction in a different material form.

Although exemplary embodiments of the present invention have been described in detail, it should be understood that various changes, substitutions and alternations could be made thereto without departing from spirit and scope of the inventions as defined by the appended claims. Variations described for exemplary embodiments of the present invention can be realized in any combination desirable for each particular application. Thus particular limitations, and/or embodiment enhancements described herein, which may have particular advantages to a particular application, need not be used for all applications. Also, not all limitations need be implemented in methods, systems, and/or apparatuses including one or more concepts described with relation to exemplary embodiments of the present invention.

Embodiments of the invention further provide a storage medium tangibly embodying a program of machine-readable instructions to carry out a method of database system recovery using a business process catalog as described in the various embodiments set forth above and described in detail.

What is claimed is:

1. A method of database system recovery, the method comprising:
    building a business process catalog, wherein the building of the business process catalog includes creating and storing at least one set of business process batches in the business process catalog using a pattern analysis of historical data of a database system and building the business process catalog further comprises:
        logging a first set of statements for a plurality of transactions of a first business process batch;
        comparing the first set of statements with a second set of statements stored in the business process catalog responsive to the pattern analysis of historical data of the database system, the second set of statements having been executed, wherein the at least one set of business process batches that is created and stored in the business process catalog includes a second business process batch having the second set of statements;
        finding, in an instance of the comparing, a match between the first set of statements and the second set of statements stored in the business process catalog, wherein for the instance of finding the match, the building of the business process catalog further comprises:
        updating the business process catalog with corresponding metadata of the second business process batch to indicate another executed instance of the stored second set of statements; and
        storing corresponding updated recovery information of the second business process batch in the business process catalog; and
    wherein the method of database system recovery further comprises:
    performing database system recovery using the updated business process catalog.

2. The method of claim 1, wherein building the business process catalog comprises:
    assigning a system assigned name generated by the database system to the first business process batch, wherein the assigning is done when all the transactions of the first business process batch are complete.

3. The method of claim 2, wherein the first set of statements and the second set of statements comprise one or more SQL statements.

4. The method of claim 2, wherein the method of database system recovery further comprises:
    finding, in an instance of the comparing, no match between the first set of statements and the second set of statements, wherein in response to finding no match between the first set of statements and the second set of statements, the step of building the business process catalog further comprises:
    storing the first business process batch in the business process catalog; and
    storing corresponding recovery information of the first business process batch.

5. The method of claim 2, further comprising:
    prompting a database system user to assign a user assigned name to the second business process batch and updating the business process catalog with the user assigned name, for a frequency of occurrence of the second business process batch greater than a pre-defined threshold during a pre-defined time interval.

6. The method of claim 5, wherein the pre-defined threshold is defined by the pattern analysis selected from a set comprising a manual analysis, an expert system based analysis, and a machine learning analysis.

7. The method of claim 1, wherein the performing comprises:
    identifying a set of business process batches in response to a request for recovery of the database system using the business process catalog;
    presenting the set of identified business process batches to a database system user;
    enabling the database system user to select a business process batch from the presented set of identified business process batches;
    fetching recovery information corresponding to the selected business process batch; and
    executing the database system recovery using the selected business process batch and the corresponding recovery information.

8. The method of claim 1, wherein the database system is configured to interact with a database system user, using a method selected from a set comprising a command prompt method and a graphical user interface (GUI) method.

9. A method of relational database system recovery, the method comprising:
    building a business process catalog, wherein the building of the business process catalog includes creating and storing at least one set of business process batches in the business process catalog using a pattern analysis of historical data of a relational database system and building the business process catalog further comprises:
    logging a first set of statements corresponding to a plurality of transactions of a first business process batch;
    assigning a system assigned name generated by the relational database system to the first business process batch, wherein the assigning is done when all the transactions of the first business process batch are complete;
    comparing the first set of statements with a second set of statements stored in the business process catalog for the instance of the pattern analysis of historical data of the database system, the second set of statements having been executed, wherein the at least one set of business process batches that is created and stored in the business process catalog includes a second business process batch having the second set of statements;
    finding, in the comparing, an instance of no match between the first set of statements and the second set of statements stored in the business process catalog, wherein for the instance of finding no match, wherein the building of the business process catalog further comprises storing the first business process batch in the business process catalog and storing corresponding recovery information of the first business process batch, wherein relational database system recovery is performed using the updated business process catalog;

finding, in an instance of the comparing, a match between the first set of statements and the second set of statements stored in the business process catalog, wherein for the instance of finding the match, the building of the business process catalog further comprises updating the business process catalog with corresponding metadata of the second business process batch, and storing corresponding updated recovery information of the second business process batch in the business process catalog to indicate another executed instance of the stored second set of statements;

prompting a relational database system user to assign a user assigned name to the second business process batch and updating the business process catalog with the user assigned name, wherein prompting is performed responsive to the match found between the first set of statements and the second set of statements and for a frequency of occurrence of the second business process batch greater than a pre-defined threshold during a pre-defined time interval;

identifying a set of business process batches in response to a request for recovery of the relational database system using the business process catalog;

presenting the set of identified business process batches to a relational database system user;

enabling the relational database system user to select a business process batch from the presented set of identified business process batches;

fetching recovery information corresponding to the selected business process batch; and executing the relational database system recovery using the selected business process batch and the corresponding recovery information.

10. A system for performing database system recovery, the system comprising:

a processor configured to build a business process catalog, wherein the building of the business process catalog includes creating and storing at least one set of business process batches in the business process catalog using a pattern analysis of historical data of a database system and building the business process catalog further comprises;

logging a first set of statements for a plurality of transactions of a first business process batch;

comparing the first set of statements with a second set of statements stored in the business process catalog responsive to the pattern analysis of historical data of the database system, the second set of statements having been executed, wherein the at least one set of business process batches that is created and stored in the business process catalog includes a second business process batch having the second set of statements;

finding, in an instance of the comparing, a match between the first set of statements and the second set of statements, wherein for the instance of finding the match, the building of the business process catalog further comprises:

updating the business process catalog with corresponding metadata of the second business process batch to indicate another executed instance of the stored second set of statements; and storing corresponding updated recovery information of the second business process batch in the business process catalog; and wherein the method of database system recovery further comprises:

the processor configured to perform database system recovery using the updated business process catalog.

11. The system of claim 10, wherein the processor configured to build a business process catalog, the processor is further configured to:

assign a system assigned name generated by the database system to the first business process batch, wherein the assigning is done when all the transactions of the first business process batch are complete.

12. The system of claim 11, wherein the processor is configured to compare the first set of statements with the second set of statements and find, in an instance of the comparing, no match between the first set of statements and the second set of statements, and wherein the processor is further configured to:

store the first business process batch in the business process catalog in response to finding no match; and store corresponding recovery information of the first business process batch.

13. The system of claim 11, wherein the processor is further configured to:

prompt a database system user to assign a user assigned name to the second business process batch and update the business process catalog with the user assigned name, for a frequency of occurrence of the second business process batch greater than a pre-defined threshold during a pre-defined time interval.

14. The system of claim 10, wherein for the database system recovery using the business process catalog, the processor is further configured to:

identify a set of business process batches in response to a request for recovery of the database system using the business process catalog;

present the set of identified business process batches to a database system user;

enable the database system user to select a business process batch from the presented set of identified business process batches;

fetch recovery information corresponding to the selected business process batch; and execute the database system recovery using the selected business process batch and the corresponding recovery information.

15. A non-volatile memory having stored thereon a program of machine-readable instructions executable by a digital processing apparatus to carry out a method of database system recovery, the instructions on the non-volatile memory being configured to:

build a business process catalog, wherein the building of the business process catalog includes creating and storing at least one set of business process batches in the business process catalog using a pattern analysis of historical data of a database system and building the business process catalog further comprises; and building the business process catalog further comprises:

logging a first set of statements for a plurality of transactions of a first business process batch;

comparing the first set of statements with a second set of statements stored in the business process catalog responsive to the pattern analysis of historical data of the database system, the second set of statements having been executed, wherein the at least one set of business process batches that is created and stored in the business process catalog includes a second business process batch having the second set of statements;

finding, in an instance of the comparing, a match between the first set of statements and the second set of statements, wherein for the instance of finding the match, the building of the business process catalog further comprises:

updating the business process catalog with corresponding metadata of the second business process batch to indicate another executed instance of the stored second set of statements; and storing corresponding updated recovery information of the second business process batch in the business process catalog; and wherein for the database system recovery the instructions on the non-volatile memory are further configured to:

perform database system recovery using the updated business process catalog.

16. The non-volatile memory of claim 15, wherein the instructions on the non-volatile memory are further configured to:

assign a system assigned name generated by the database system to the first business process batch, wherein the assigning is done when all the transactions of the first business process batch are complete.

17. The non-volatile memory of claim 16, wherein the instructions on the non-volatile memory are further configured to:

find, in an instance of the comparing, no match between the first set of statements and the second set of statements, wherein for the instance of finding no match between the first set of statements and the second set of statements, for building the business process catalog the instructions on the non-volatile memory are further configured to;

store the first business process batch in the business process catalog and store corresponding recovery information of the first business process batch.

18. The non-volatile memory of claim 16, wherein the instructions on the non-volatile memory are further configured to:

prompt a database system user to assign a user assigned name to the second business process batch and update the business process catalog with the user assigned name, wherein prompting is performed for a match is found between the first set of statements and the second set of statements and for a frequency of occurrence of the second business process batch is greater than a pre-defined threshold during a pre-defined time interval.

19. The non-volatile memory of claim 15, wherein the instructions on the non-volatile memory are further configured to:

identify a set of business process batches in response to a request for recovery of the database system using the business process catalog;

present the set of identified business process batches to a database system user;

enable the database system user to select a business process batch from the presented set of identified business process batches;

fetch recovery information corresponding to the selected business process batch; and execute the database system recovery using the selected business process batch and the corresponding recovery information.

* * * * *